United States Patent [19]
Koreeda

[11] Patent Number: 5,890,137
[45] Date of Patent: Mar. 30, 1999

[54] ON-LINE SHOPPING SYSTEM AND THE METHOD OF PAYMENT SETTLEMENT

[75] Inventor: Hiroki Koreeda, Tokyo, Japan

[73] Assignee: Kabushiki Kaisha N.K. Kikaku, Tokyo, Japan

[21] Appl. No.: 687,729

[22] Filed: Jul. 26, 1996

[30] Foreign Application Priority Data

Dec. 15, 1995 [JP] Japan ................................. 7-348056

[51] Int. Cl.$^6$ .............................................. G06F 17/60
[52] U.S. Cl. .............................. 705/26; 705/24; 705/25; 705/26; 364/408; 380/24
[58] Field of Search ................................. 705/24, 26, 27; 364/408; 380/24

[56] References Cited

U.S. PATENT DOCUMENTS

| 4,823,264 | 4/1989 | Deming .................................. 364/408 |
| 5,692,132 | 11/1997 | Hogan ........................................ 705/27 |
| 5,710,887 | 1/1998 | Chelliah et al. .......................... 705/26 |
| 5,715,314 | 2/1998 | Payne et al. .............................. 380/24 |
| 5,727,163 | 3/1998 | Bezos ......................................... 705/27 |
| 5,732,400 | 3/1998 | Mandler et al. .......................... 705/26 |

FOREIGN PATENT DOCUMENTS

WO 95/12859  5/1995  WIPO .
WO 95/16971  6/1995  WIPO .

OTHER PUBLICATIONS

European Search Report from 96 11 4545, which corresponds to the instant application.
Compcon '95 Technologies for the Information Superhighway, Digest of Papers: (IEEE) Comput. Soc. Press *Requirements for network Payment: the Netcheque Perspective*, B. Clifford Neuman et al. pp. 32–36.

Primary Examiner—Allen R. MacDonald
Assistant Examiner—Jagdish Patel
Attorney, Agent, or Firm—Wolf, Greenfield & Sacks, P.C.

[57] ABSTRACT

When performing on-line shopping using the Internet, and when performing payment settlement for a product by a credit card, user's card data runs over the Internet, leaving the possibility of card data leakage, thereby causing a security problem. The user decides the product he or she wants to buy via a computer network (Internet) from a user system. Then, a transmission unit calls up a service center to send order data including the credit card data via a settlement network. Service center invoices the sales price to an approval center based on the order data. Approval center pays the price to service center. Then, service center sends the order data to the shopping system. A delivery processing unit then delivers the product to the user based on the order data.

29 Claims, 19 Drawing Sheets

SYSTEM CONFIGURATION OF ONLINE SHOPPING SYSTEM

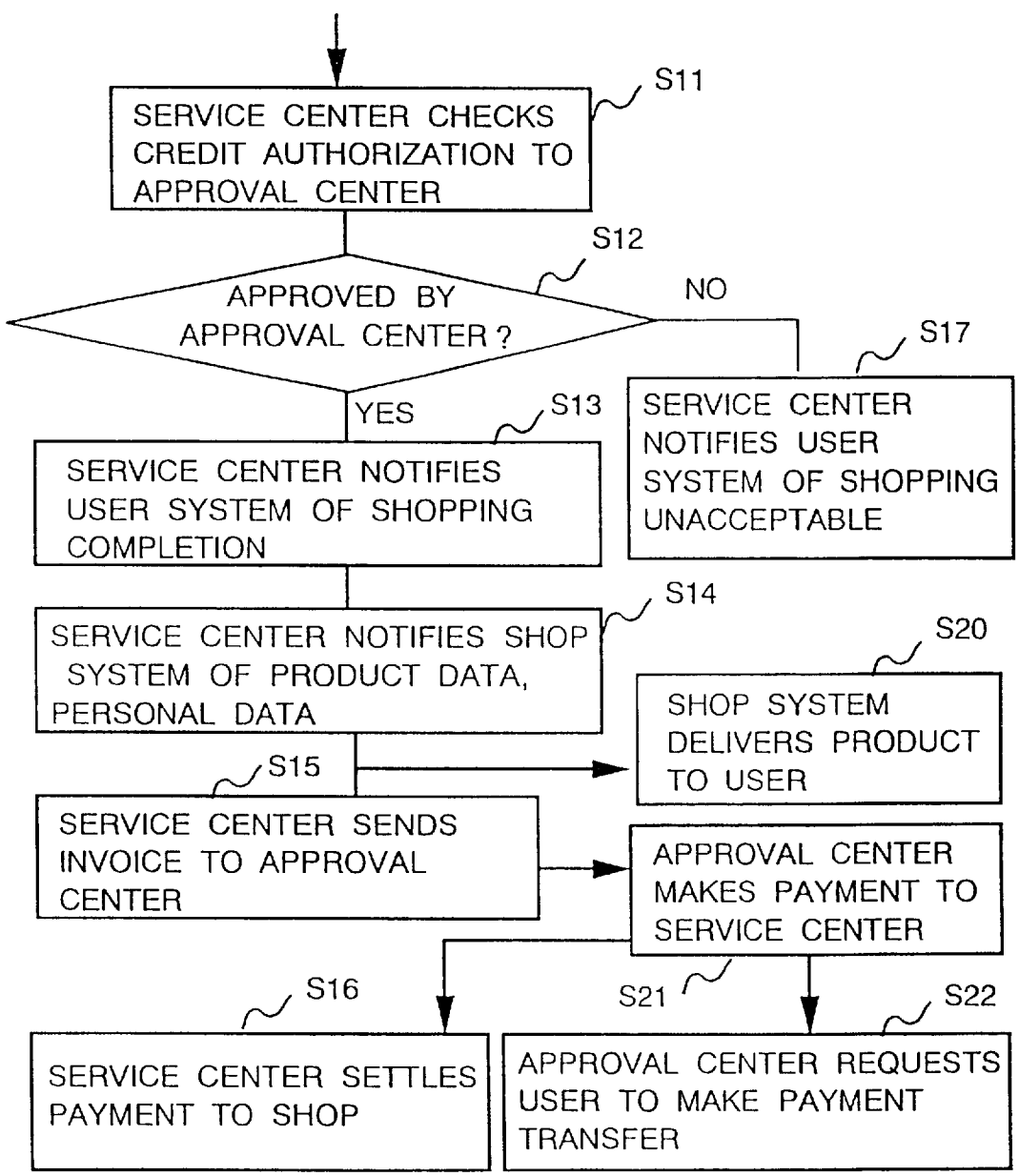

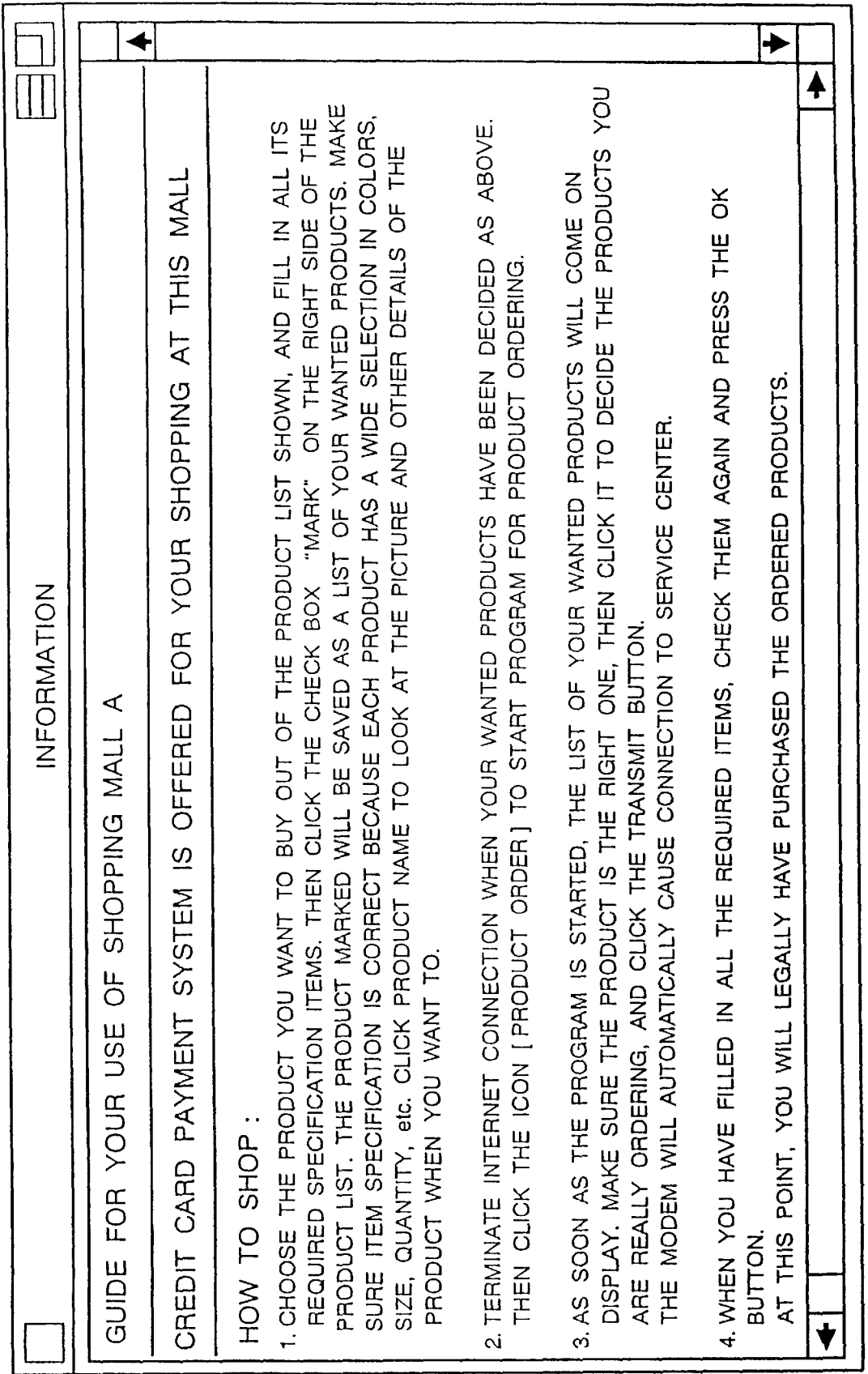

Fig.5

PRODUCT LIST

PRODUCT LIST SHOPPING MALL A

THIS IS THE PRODUCT LIST FOR YOUR SHOPPING.

IF YOU FIND ANY PRODUCT YOU WANT TO BUY, FILL IN ALL ITS REQUIRED SPECIFICATION ITEMS AND THEN CLICK THE CHECK BOX [MARK] ON THE RIGHT SIDE.

● 1. PRODUCT NUMBER : 0001 / PRODUCT NAME : SNEAKERS / AMOUNT ¥7,000
QUANTITY : ☐ / COLOR : ○BLACK ○WHITE        MARK

● 2. PRODUCT NUMBER : 0002 / PRODUCT NAME : SWEAT SHIRT / AMOUNT ¥6,000
QUANTITY : ☐ / COLOR : ○WHITE ○GREEN        MARK
/ SIZE : ○M ○L

| PRODUCT NAME | T-SHIRT | SNEAKERS | TRAVELING SET |
|---|---|---|---|
| DATE OF VISIT | 1995/10/15 | 1995/11/1 | 1995/11/1 |
| | PURCHASED | PURCHASE | |
| PRODUCT NO. | #-7550 | A-0001 | B-2050 |
| UNIT PRICE | ¥2,980 | ¥7,000 | ¥4,500 |
| QUANTITY | 2 | 1 | 1 |
| DATE OF PURCHASE | 1995/10/15 | | |
| CREDIT CARD USABLE | Amex,Visa,Master | Amex,Diners | Amex,Diners |
| SHOP ADDRESS | http://###.###/ | http://mall-a/ | http://mall-b/ |
| SHOPPING MALL CODE, ETC. | #7526 | A4649 | B3641 |

● PURCHASE
○ CANCEL
○ DELETE

WHAT IS YOUR DECISION ON
YOUR WANTED PRODUCT(S)
CHOSEN ABOVE ?

32

TODAY'S TOTAL AMOUNT  ¥7,000

PRESS TRANSMIT BUTTON TO GO TO THE SCREEN FOR
ENTERING PERSONAL DATA AND CREDIT CARD DATA.

TRANSMIT    QUIT

LIST OF YOUR WANTED PRODUCTS

Fig.7

PERSONAL DATA ENTRY

NAME(KANJI):

KANA LETTERS:

ZIP :

PREFECTURE:

ADDRESS:

PHONE NO.:

DATE OF BIRTH:

AGE:    SEX:    BLOOD TYPE:

ENTER DATA BELOW IF PRODUCT TO BE DELIVERED TO THE ADDRESS OTHER THAN ABOVE

NAME(KANJI):

KANA LETTERS:

ZIP :

PREFECTURE:

ADDRESS:

PHONE NO.:

CLICK OK BUTTON TO CONFIRM ABOVE ALL CORRECT    OK

Credit Card Data Entry

CHOOSE YOUR CREDIT CARD BEING USED [ AMEX ] [↓]

ENTER YOUR CREDIT CARD NUMBER (16 DIGITS)
[       ] — [       ] — [       ] — [       ]

ENTER YEAR AND MONTH GOOD THROUGH
OF YOUR CREDIT CARD ABOVE          [       ]
    (EX : DECEMBER 1999=9912)

ENTER YOUR PASSWORD CODE (4 DIGITS) [       ]

ENTER PAYMENT METHOD [ ]
    1. LUMP SUM   2. INSTALLMENTS   3. REVOLVING

CLICK OK BUTTON TO CONFIRM
              ABOVE ALL CORRECT  [ OK ]

AN IMAGE OF THE SCREEN FOR CONFIRMING THE USER'S FINAL INTENT OF PURCHASE

Fig.14

| DATA ITEM NAME | | NO. OF BYTES |
|---|---|---|
| VERSION INFORMATION | | 1 |
| PRODUCT DATA | PRODUCT NAME | 30 |
| | MAKER | 20 |
| | PRODUCT CODE | 30 |
| | PRODUCT SUB CODE | 20 |
| | TYPE OF CURRENCY | 1 |
| | PRICE | 15 |
| | TAX INFORMATION | 5 (%) |
| | QUANTITY ATTRIBUTE | 1 |
| | QUANTITY | 10 |
| | ORDER TIME | 15 |
| | ORDER EXPIRATION | 15 |
| | INVENTORY INFORMATION | VARIABLE LENGTH |
| | DELIVERY METHOD | VARIABLE LENGTH |
| | PRODUCT INFORMATION | VARIABLE LENGTH |
| (SELLER DATA) | SHOPPING MALL ID CODE | 8 |
| | SHOP ID CODE | 12 |
| | MALL | 15 |
| | TERMS OF FREE CHARGE | 1 |
| | LOWERMOST PURCHASE AMOUNT FOR FREE MAIL | 15 |

↳ CONTINUED TO NEXT PAGE

Fig.15

CONTINUED FROM FIG.14

| | | | | |
|---|---|---|---|---|
| (SELLER DATA) | AVAILABLE CREDIT CARD DATA | CARD TYPE DATA | 2 | NO. OF DATA VARIABLE |
| | | PAYMENT METHOD DATA | 1 | |
| | INQUIRY E-MAIL ADDRESS | | VARIABLE | |
| PERSONAL DATA (PURCHASER DATA) | NAME(KANA) | | 20 | |
| | NAME(KANJI) | | 30 | |
| | SEX | | 1 | |
| | DATA OF BIRTH | | 10 | |
| | BLOOD TYPE | | 20 | |
| | PHONE NO. (HOME) | | 20 | |
| | PHONE NO. (OFFICE) | | 20 | |
| | E-MAIL ADDRESS | | VARIABLE | |
| | HOME ADDRESS | | VARIABLE | |
| | ZIP CODE | | 10 | |
| | PRODUCT ADDRESSEE DATA | NAME(KANA) | 20 | |
| | | NAME(KANJI) | 30 | |
| | | ADDRESS | VARIABLE | |
| | | ZIP CODE | 10 | |
| CREDIT CARD DATA | CREDIT CARD USABLE | | 2 | |
| | CREDIT CARD NO. | | 20 | |
| | PASSWORD CODE | | 10 | |
| | CREDIT CARD EXPIRATION | | 6 | |

Fig.18

(A) SCRAMBLES 29 DIGITS OF
   CREDIT CARD DATA + RANDOM NUMBER 1
      (24 DIGITS)           (5 DIGITS)

(B) SCRAMBLE METHOD

DIGIT 1  → DIGIT 2
   DIGIT 2  → DIGIT 3
   DIGIT 3  → DIGIT 4
      ⋮         ⋮
   DIGIT 28 → DIGIT 29
   DIGIT 29 → DIGIT 1

Fig.19

(A) EXAMPLE OF ENCIPHERMENT 3.

CREDIT CARD DATA  +  RANDOM  +  RANDOM
   AFTER SCRAMBLING     NUMBER 1    NUMBER 2

(B) EXAMPLE OF ENCIPHERMENT 4.

SCRAMBLES 29 DIGITS
   OF CREDIT CARD DATA (24 DIGITS)
         + RANDOM            + RANDOM
            NUMBER 1 (5 DIGITS)    NUMBER 2

(C) EXAMPLE OF ENCIPHERMENT 5.

SCRAMBLES 35 DIGITS
   OF CREDIT CARD DATA (24 DIGITS)
         + RANDOM            + RANDOM
            NUMBER 1 (5 DIGITS)    NUMBER 2 (6 DIGITS)

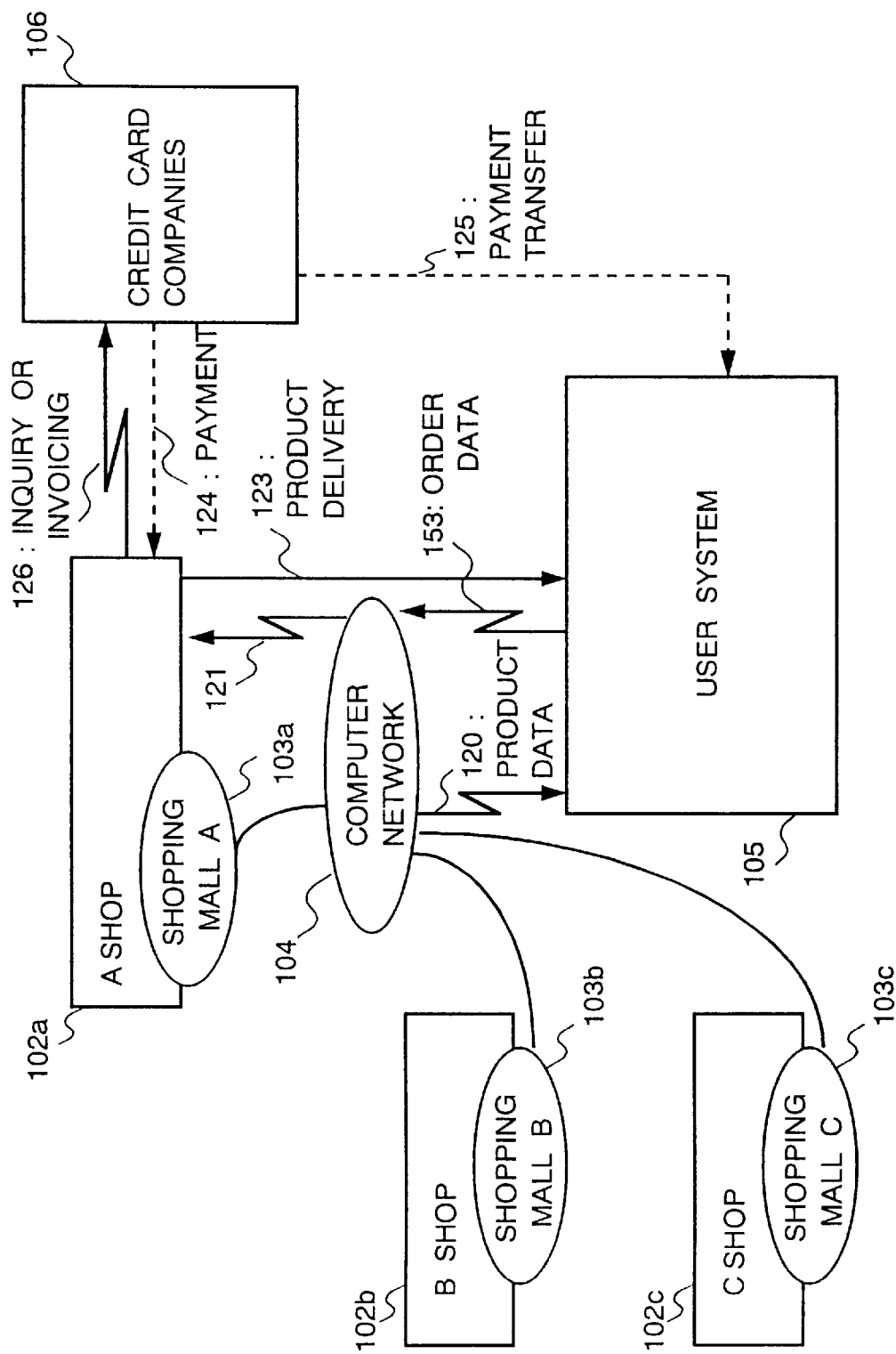

ON-LINE SHOPPING SYSTEM AND THE METHOD OF PAYMENT SETTLEMENT

FIELD OF THE INVENTION

This invention relates to on-line shopping using a computer network. Especially, it relates to on-line shopping via the Internet. Moreover, in this invention, payment settlement is conducted with a credit card. The credit card data runs on a special network. This invention relates to the on-line shopping system for preventing the leakage of card data and the method of payment settlement.

DESCRIPTION OF THE RELATED ART

Conventional Embodiment 1

Conventionally, for on-line shopping using a computer network, users order products through a facsimile machine or telephone.

FIG. 20 shows a system configuration of a conventional on-line shopping.

In FIG. 20, a user arbitrarily connects to a shopping mall A 103a offered by a store A 102a, a shopping mall B 103b offered by a store B 102b, or a shopping mall 103c offered by a store C 102c via a computer network 104 through a user system 105 (computer). Shopping is enabled by referring shopping data offered by each shopping mall on a computer screen. When the user decides which product to buy, the user will fill out the name of the product, the quantity of the product, and the name, address, and the phone number to which the product is to be delivered, and a method of payment for the product to be purchased, etc. in a prepared order form for the product. And, using a facsimile machine 152, the written order form is sent to the pertinent store. When a facsimile machine is not available in the neighborhood of the user, the user calls up the pertinent store and tells the order data of the product to be purchased. It is also possible to mail the written order form to the pertinent store. The order form is prepared in advance by outputting from a printer (not shown) provided with user system 105. The order form can be asked to be mailed from the store. For instance, store A 102a receives an order from a user for product purchase. Store A 102a checks the payment method, and when the payment is made with a credit card, the store conducts credit authorization check 126 of the product purchaser to a pertinent credit card company 106. After credit authorization check 126 is made, and if the credit card is proven to be valid, store A 102a performs delivery 123 of the ordered product to the product purchaser. The sales price is invoiced to the pertinent credit card company 106 through sales invoice 126. In accordance with the invoice, the credit card company performs payment settlement 124 to store A 102a. Then a payment transfer 125 is requested to the user who purchased the products.

In this way, products are ordered with a facsimile machine, telephone or by mail for the conventional on-line shopping. The leakage of the user card data was thus prevented. However, the user had to take trouble of filling out the order form or sending it through a facsimile machine, telephone, or by mail.

Conventional Embodiment 2

FIG. 21 shows a system configuration of another on-line shopping.

In FIG. 21, the user connects user system 105 with computer network 104, and sends order data 153 to store A 102a via computer network 104. In conventional embodiment 1, an order form with written order data is sent to store A 102a using facsimile machine 152, telephone, or by mail. But in Embodiment 2, the user sends the order data to store A 102a via computer network 104. That is, when the payment method of the price is settled with a credit card, the card data runs on computer network 104. When the above computer network 104 is the Internet, any user having the access authorization of the network can make an access. Because of this, there is a possibility of card data leakage.

PROBLEMS TO BE SOLVED BY THE INVENTION

The conventional on-line shopping system is configured as explained above. When the user performs ordering of a product to be purchased, the user has to therefore order the product by filling out the order contents in the order form and then order the product with a facsimile machine, telephone, or by mail. The order of products with a facsimile machine or telephone lacks instantaneousness. The order by mail, on the other hand, is disadvantageous in taking time for the order form to reach the store. When the order is made with a facsimile machine, the user has to take trouble of writing the order content in the order form. The order over the telephone, on the other hand, is apt to cause order errors due to mishearing because the order is made through voice.

In addition, when order data or card data is sent on the computer network, such as the Internet, to which the public can freely make an access, because any person other than the user who made the order can access the computer network, it has a problem of not being able to prevent the card data from getting leaked.

This invention is designed to solve the above mentioned problems. It is the primary objective of this invention to achieve the on-line shopping system with which product order and its settlement can be conducted using a computer network without having any card data leaked and at real time.

SUMMARY OF THE INVENTION

An on-line shopping system using a computer network of this invention may include the following elements:

(a) a store system for memorizing product data and providing a shopping mall for products via a shopping mall network;

(b) a user system, connected to the shopping mall network, including a product selection unit for selecting a product to be purchased from the shopping mall provided by the store system, a download unit for downloading the selected product data from the store system via the shopping mall network, and a transmission unit for inputting payment settlement data of the product and personal data of the user who selects the product, for setting a settlement network different from the shopping mall network, and for transmitting the selected product data, the payment settlement data and the personal data via the settlement network based on a first protocol; and (c) a service center for receiving the selected product data, the payment settlement data, and the personal data via the settlement network, from the user system and then performing a payment settlement.

The on-line shopping system may further include an approval center for approving the payment settlement based on a second protocol different from the first protocol, and wherein the service center may select at least the payment settlement data among the received product data, the payment settlement data, and the personal data received based on the first protocol, may convert the at least the payment settlement data to be a suitable data to the second protocol, and then may request the approval of the payment settlement to the approval center.

In the on-line shopping system, the user system may include an encipherment unit for enciphering at least part of the selected product data, the payment settlement data, and the personal data, and wherein the service center may include a decoding unit for decoding the enciphered part of the selected product data, the payment settlement data, and the personal data.

In the on-line shopping system, the service center may further include a distribution unit for distributing the product data and the personal data for which the payment settlement has been approved, and wherein the store system may further include a delivery processing unit for receiving the product data and the personal data and then may perform a delivery process of the product.

In the on-line shopping system, the user system may transmit the card data of the credit card as the payment settlement data, and wherein the approval center may approve the payment settlement based on the card data.

In the on-line shopping system, the download unit may download the product data with the same format from a plurality of different shopping malls, the transmission unit may transmit one card data as the payment settlement data for the plurality of products downloaded from the plurality of different shopping malls, and wherein the service center may request the approval center to collectively settle the plurality of products with one card data.

In the on-line shopping system, the user system may further include a product confirmation unit for selecting a product to be purchased from the downloaded products.

In the on-line shopping system, the approval center may further include a payment collection unit for collecting the payment based on the card data.

In the on-line shopping center, the service center may further include an accumulation unit for summing up amounts of the payment settlement based on the card data in correspondence with each of the plurality of the approval centers.

In the on-line shopping system, the shopping mall network may be a computer network that can be accessed by a third party, and the settlement network may be a network set separately between the user system and the service center.

In the on-line shopping system, the shopping mall network may be Internet.

In the on-line shopping system, the settlement network may be formed by a public line, wherein the first protocol may be Point-to-Point Protocol, wherein the second protocol may be a protocol which is used between the shop system and the approval center for a shopping by the credit card.

A payment settlement method may include a store system offering shopping malls, a user system that may select a product to be purchased from the shopping malls, a credit card company system that may approve a payment settlement with a credit card, and a service center which may exist among the store system, the user system and the credit card company system, the payment settlement method may further include;

(a) selecting a product to be purchased from shopping malls offered by a shopping system via a shopping mall network in the user system;

(b) downloading the data of the selected products from the shopping system into the user system via the shopping mall network;

(c) transmitting the data of the downloaded products, the data of the credit card for the payment settlement, and the data of the purchaser of the product from the user system to the service center using a settlement network different from the shopping mall network;

(d) requesting an approval of the payment settlement from the service center to the credit card company system based on the credit card data for the payment settlement;

(e) approving the payment settlement in the credit card company system based on the credit card data;

(f) distributing the product data approved by the credit card company system for the payment settlement and the data of the product purchaser from the service center to the store system; and (g) collecting the payment in the credit card company system from the purchaser of the product based on the credit card data;

In the payment settlement method, the step for requesting the approval of the payment settlement may further include a step of converting the received credit card data suitable to a predefined approval protocol provided by the credit card company system.

In the payment settlement method, the step for selecting the product may further include a step of selecting products from different shopping malls, and wherein the step for downloading may include a step of storing the data of products selected from different shopping malls in a same format.

In the payment settlement method, the method may further include the step of confirming a product to be purchased based on the product data downloaded between the downloading step and the transmitting step.

In the payment settlement method, the method may further include step of corresponding one credit card data to the plurality of products selected from the different shopping malls between the above downloading step and the transmitting step, and wherein the step for approving the payment settlement may include step of settling collectively for the plurality of products purchased based on one credit card data.

In the payment settlement method, the method may further include step of connecting the user system to Internet as the shopping mall network to access the shopping mall.

In the payment settlement method, the transmitting step may further include a step of generating a settlement network using a public line based on Point-to-Point Protocol.

BRIEF EXPLANATION OF THE DRAWINGS

Other objects features, and advantages of the invention will be apparent from the following description when taken in conjunction with the accompanying drawings.

FIG. 3 is a flowchart showing the continuation of FIG. 2.

FIG. 4 is a figure showing an example of a guide screen of the on-line shopping mall A of this invention.

FIG. 5 is a figure showing an example of a product list screen of the on-line shopping mall A of this invention.

FIG. 6 is a figure showing an example of a purchase product selection screen of this invention.

FIG. 7 is a figure showing an example of a personal data input screen to input the personal data of the user of this invention.

FIG. 8 is a figure showing an example of a card data input screen to input the credit card data of the user of this invention.

FIG. 14 is a figure showing an example of the product data, seller data, and personal data of this invention.

FIG. 15 is a figure showing the continuation of FIG. 14.

FIG. 18 is a figure showing an encipherment example 2 of this invention.

FIG. 19 is a figure showing encipherment examples of 3, 4, 5 of this invention.

FIG. 21 is a figure showing a system configuration of the conventional on-line shopping system.

DESCRIPTION OF THE PREFERRED EMBODIMENTS

Embodiment 1

Embodiment 1 explains an example of the on-line shopping system using a settlement network for sending order data of the products.

Figure 1:
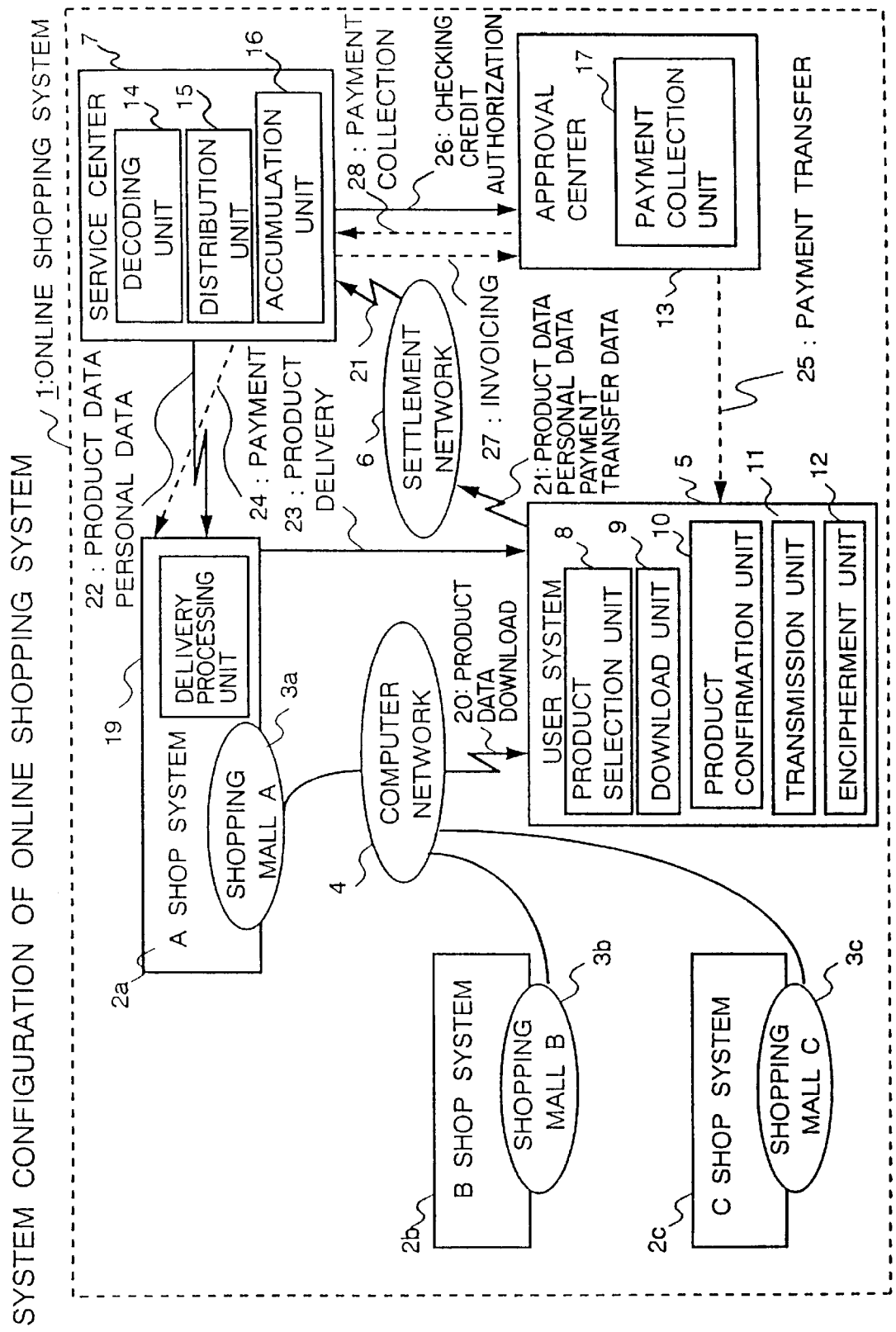
FIG. 1 is the system configuration showing an example of the on-line shopping system of this invention.

FIG. 1 is a system configuration showing an example of the on-line shopping system of this invention.

In FIG. 1, a store A system 2a of store A provides users with shopping data by connecting shopping mall A 3a with computer network 4. Likewise, store B system 2b of store B and store C system 2c of store C connects shopping mall B 3b and shopping mall C 3c with computer network 4 respectively, to offer users with shopping data. The user, by connecting user system 5 having a computer with computer network 4, and by referring to the shopping data of the above shopping mall A 3a through shopping mall C 3c, can make an order for the product to be purchased. The settlement of the product to be purchased is performed by using a settlement network 6. Settlement network 6 connects user system 5 with a service center 7, for instance, TCP/IP (Transmission Control Protocol/Internet Protocol) is adapted, and a public line is used. Service center 7 receives the order data of the product data, personal data, and payment settlement data 21 from user system 5. Service center 7 sends the payment settlement data concerning the payment to an approval center 13, a credit card company. When an approval has been given by approval center 13, service center 7 sends the product data, personal data 22 for the product delivery to the pertinent store. At each store system 2a to 2c, conducts delivery 23 of the ordered product to the user in accordance with the product data, personal data 22 received from service center 7. Service center 7, for instance, issues a sales invoice 27 to approval center 13 by accumulating the sales amount every month. Based on the sales invoice 27 received from service center 7, approval center 13 makes a payment for service center 7 (it is a payment collection 28 when viewed from service center 7). Service center 7 makes the payment to each store using the collected money. Furthermore, approval center 13 requests payment transfer 25 to the user.

Although shown only one in the figure, service center 7 is connected to a plurality of approval centers 13 (two or more credit card companies).

A conceptual flow of the on-line shopping system is as explained as above. Each store system 2a to 2c, user system 5, service center 7, and approval center 13 have the each processing unit as explained below to enable the above processing.

Each store system 2a to 2c is provided with a delivery processing unit 19. This delivery processing unit 19 is provided with, for instance, a personal computer or a business terminal. As delivery processing unit 19 outputs a delivery instruction based on the product data, personal data 22 received from service center 7, each store performs product delivery 23 to the user according to the delivery instruction. For instance, the product is delivered by mail packaging or parcel service.

User system 5 is provided with a product selection unit 8, a downloading unit 9, a product confirmation unit 10, transmission unit 11, and an encipherment unit 12. The five processing units are configured by combining hardware or one or more programs that run on a computer. The user sets an environment that enables activation and execution of the above programs on user system 5. The user can buy a program stored in a floppy disk or compact disk for the above programs. Or a store system 2a to 2c can send such a floppy disk or compact disk to the user by direct mail.

Functions of the above five processing units are explained below one by one.

Product selection unit 8 makes an access to shopping mall A 3a through shopping mall C 3c via computer network 4, and selects a product to purchase by referring to the product data provided by shopping mall A 3a through shopping mall C 3c. Also, download unit 9 stores the data of the product desired by a user to be purchased through product selection unit 8 in a hard disk provided with the computer of user system 5.

Then, product confirmation unit 10 finally makes the user to decide which product to buy among the products the user desired to purchase from shopping mall A 3a through shopping mall C 3c using product selection unit 8. Also, it makes the user to input the personal data of the user and credit card data to be used as the payment settlement data. Transmission unit 11 sets a settlement network 6 between service center 7 to send the product data, personal data, payment settlement data 21 from user system 5 to service center 7 via settlement network 6. To improve security in transmitting the product data, personal data, and payment settlement data to the service center from transmission unit 11, encipherment unit 12 ciphers the above data.

Service center 7 is provided with a decoding unit 14, a distribution unit 15, and an accumulation unit 16. Decoding unit 14 decodes enciphered product data, personal data, and payment settlement data 21 received from user system 5 via a settlement network 6. Service center 7 performs credit authorization check of the user who does on-line shopping to the corresponding approval center 13 by credit authorization check 26. Distribution unit 15 transmits the product data and personal data 22 among the order data approved by the approval center 13 for settlement out of the product data, personal data, and payment settlement data 21 received from user system 5 via settlement network 6 to shop systems 2a to 2c. Service center 7 is connected to the personal computers (hereinafter referred to as the PC) of shop systems 2a to 2c via communication line. Shop systems 2a to 2c are provided with a delivery processing unit 19, respectively, and outputs a delivery instruction.

Accumulation unit 16, for instance, sums up total sales amount to make an invoice for each of approval centers 13 once a month. Service center 7 invoices each approval center 13 according to the sales amount summed up by accumulation unit 16 as sales invoice 27. Approval center 13 is provided with a payment collection unit 17. Payment collection unit 17 requests payment transfer 25 of the amount purchased to the user who has done on-line shopping. This payment transfer 25 uses the conventional payment system for credit cards developed by credit card companies.

Figure 2:
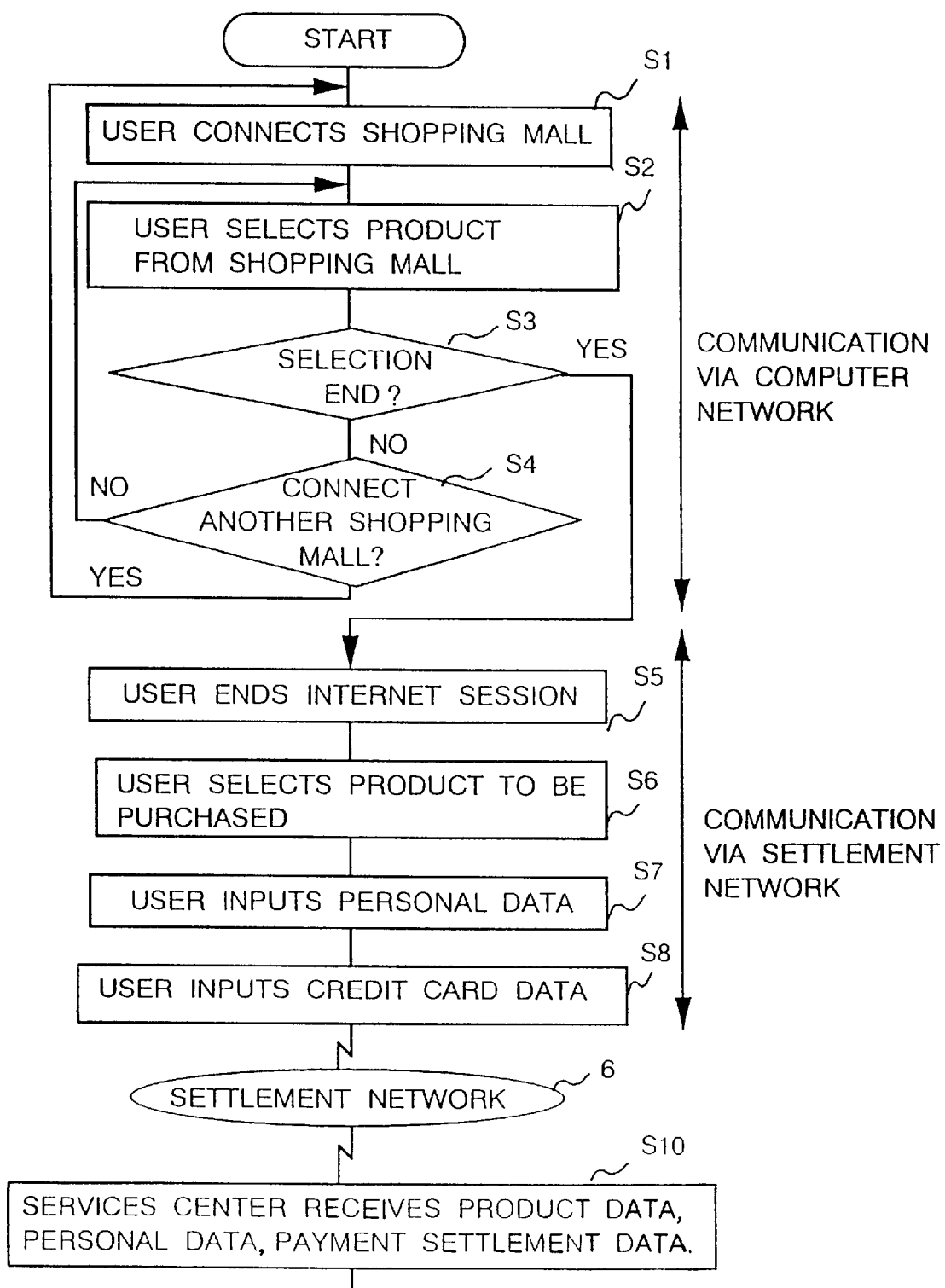
FIG. 2 is a flowchart showing the using procedure of the on-line shopping system of this invention.

FIG. 2 is a flowchart showing the using procedure of the on-line shopping system of this invention.

FIG. 3 continues from FIG. 2 and is a flowchart showing the using procedure of the on-line shopping system of this invention.

FIG. 4 is a figure showing an example of information screen of a shopping mall A of this invention.

Information screen 30 is a guide screen displayed on the PC display screen initially when the user connects the PC to shopping mall A 3a of the store A system 2a via computer network 4. Information screen 30 is the screen explaining the using method of shopping mall A 3a for on-line shopping to the user.

FIG. 5 is a figure showing an example of a product list screen for shopping mall A of this invention.

A product list screen 31 is a screen showing the list of products on market at shopping mall A 3a. The user selects the product that the user wishes to buy by a click of the MARK button, by referring to product list screen 31. This work is performed by product selection unit 8.

FIG. 6 is a figure showing an example of purchase product selection screen of this invention.

Purchase product selection screen 32 displays data of products the user wished to purchase on product list screen 31. This example also displays the data of the products purchased when the user went on-line shopping before. The user once again selects and confirms the products to be purchased among the product list displayed on purchase product selection screen 32. This selection operation of the product is performed by product confirmation unit 10.

FIG. 7 is a figure showing an example of a screen for inputting personal data of the user of this invention.

The user inputs personal data such as name or address to a personal data entry screen 33.

FIG. 8 is a figure showing an example of a screen for inputting credit card data of the user of this invention.

The user performs an input of credit card data with which to settle payment to card data entry screen 34.

Figure 9A:
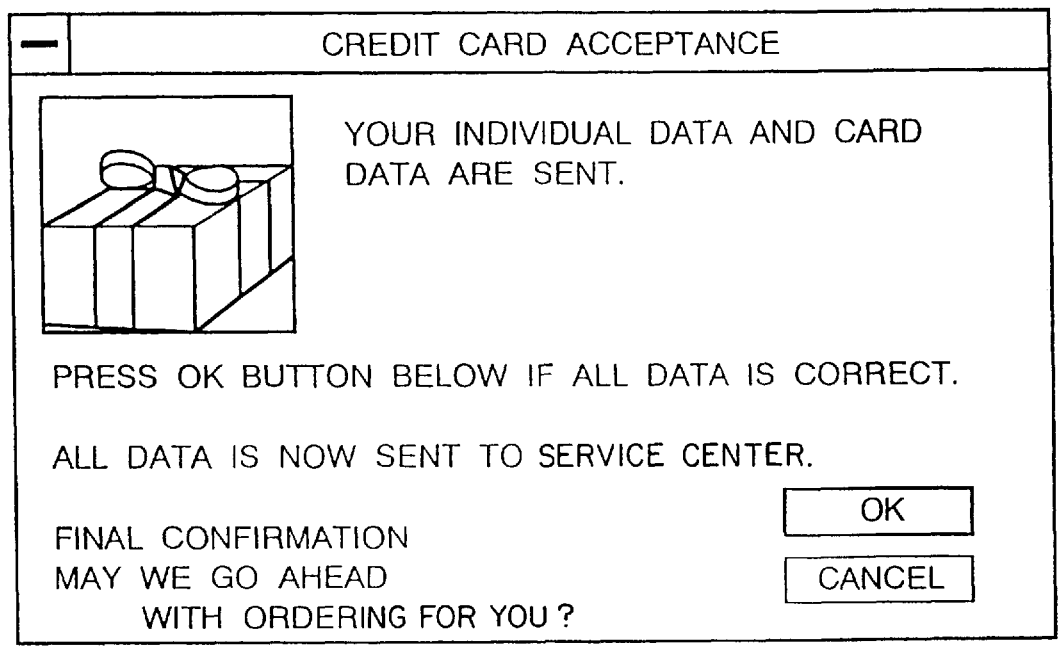
FIG. 9A and FIG. 9B are figures showing examples of screens of the on-line shopping end of this invention.
Figure 9B:
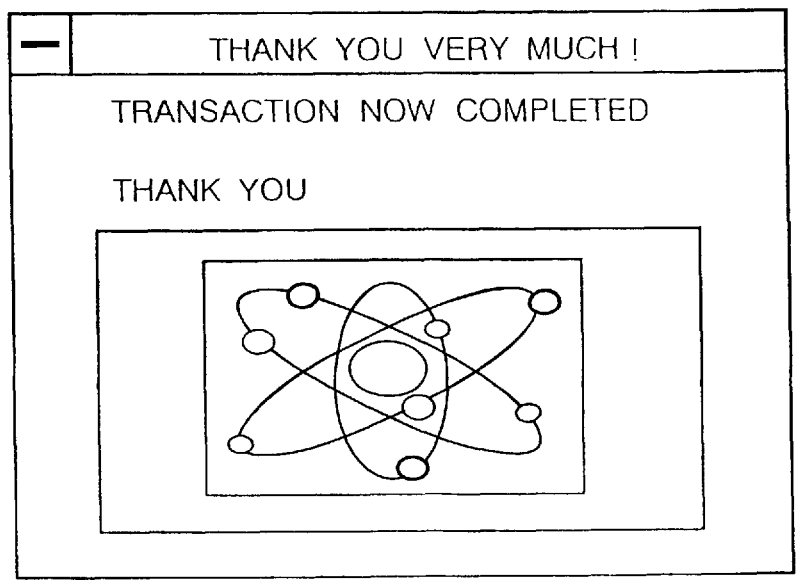

FIG. 9A and FIG. 9B are the figures showing examples of screens for finishing on-line shopping of this invention.

On the screen of FIG. 9A, when the OK button is clicked by the mouse, user system 5 enciphers the product data, personal data, payment settlement data (credit card data) by encipherment unit 12. Then, it transmits the product data, personal data, and payment settlement data 21 to service center 7 via settlement network 6 by transmission unit 11. And, after the product data, personal data, and payment settlement data 21 have been sent to service center 7 and the use of the credit card is approved, a screen of FIG. 9B is displayed, notifying that the on-line shopping has been completed.

Figure 10:
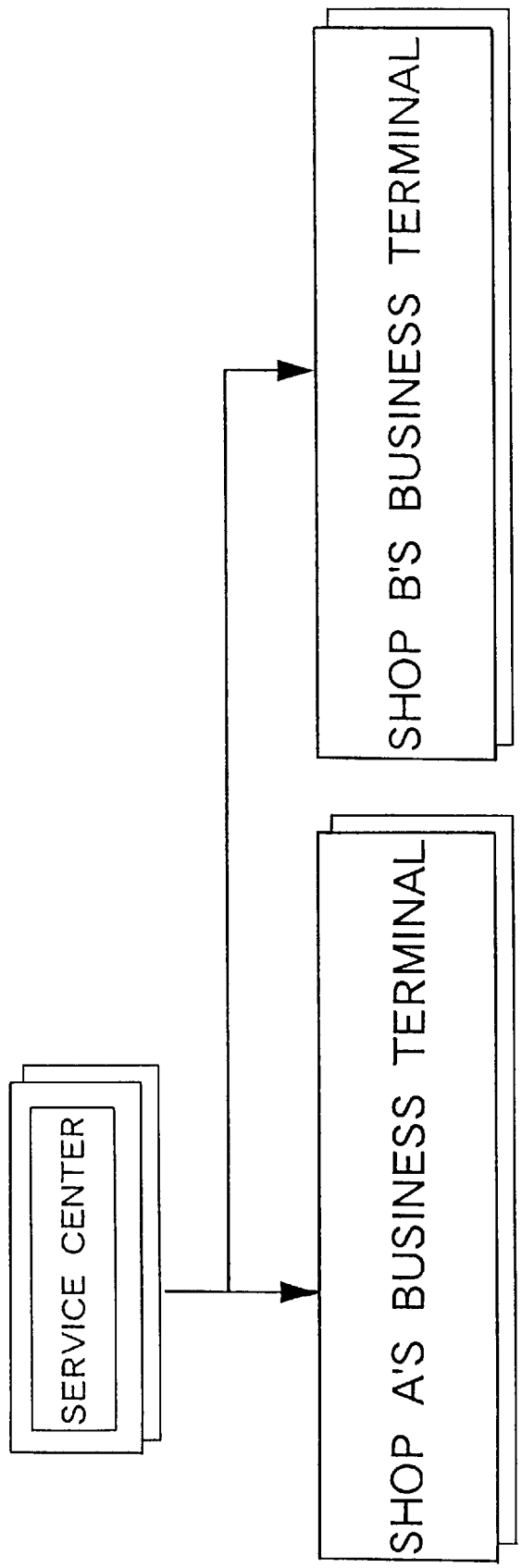
FIG. 10 is a figure showing the flow of received data of this invention.

FIG. 10 is a figure showing the flow of ordered data of this invention.

With this invention, ordered product data is sent to a business terminal or the PCs of each shop from the service center as shown in FIG. 10.

Figure 11:
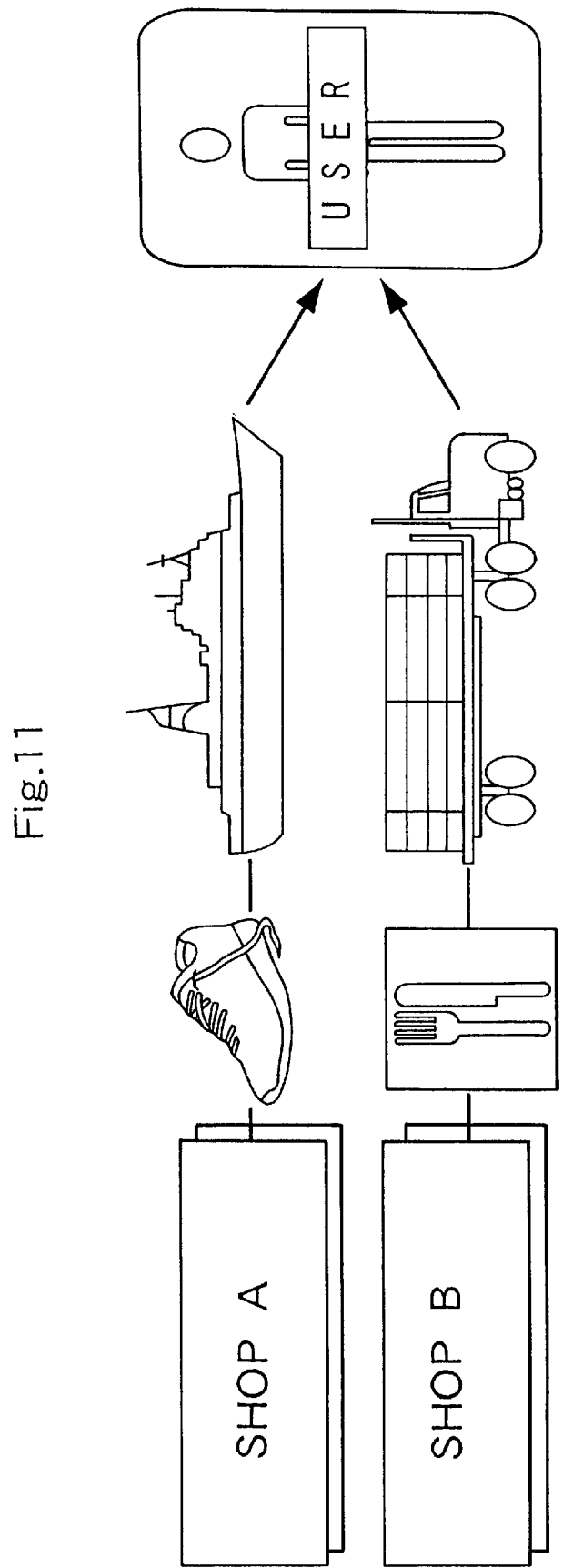
FIG. 11 is a figure showing the product flow of this invention.

FIG. 11 is a figure showing the flow of products of this invention.

With this invention, the product is delivered from each shop to the user as shown in FIG. 11.

Figure 12:
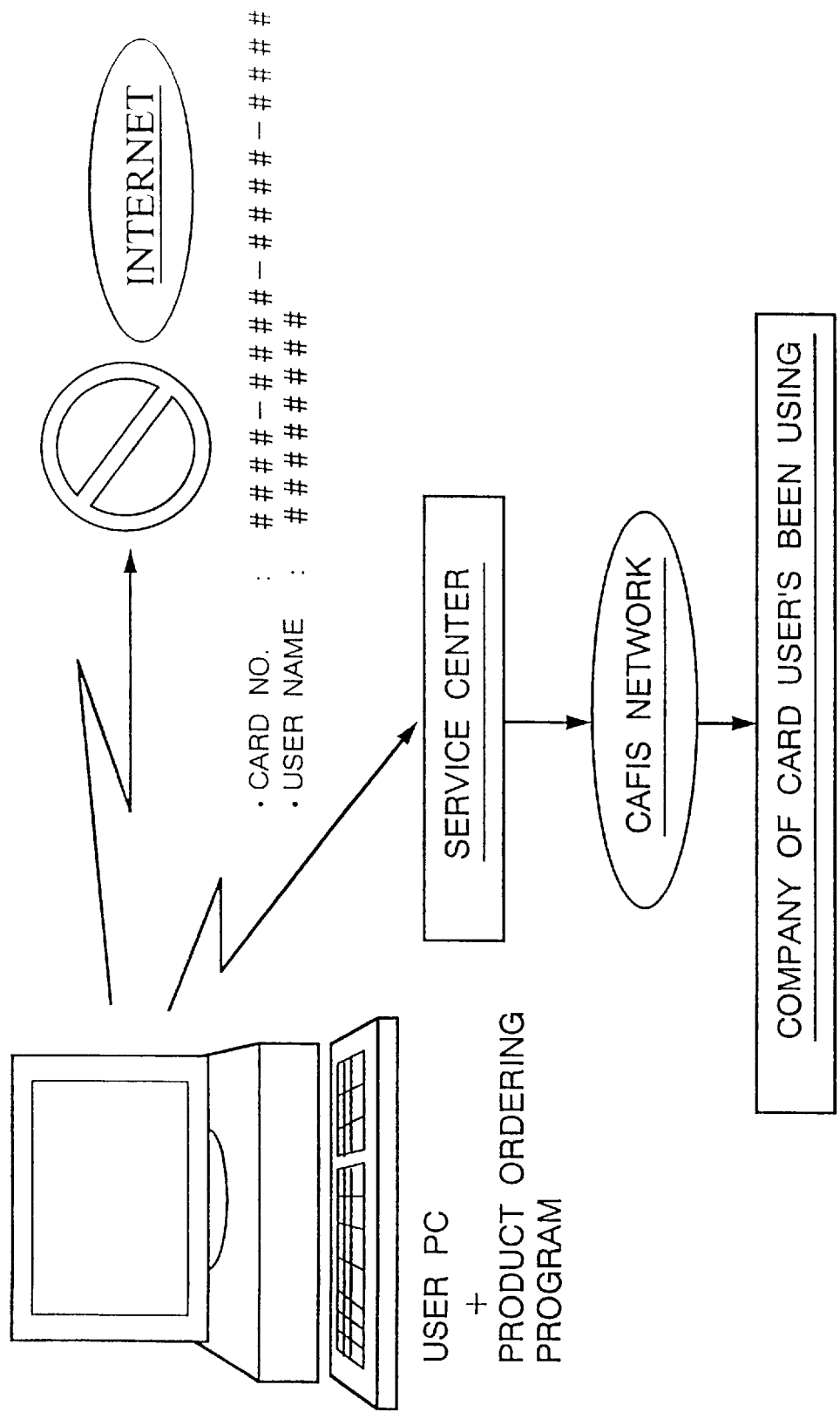
FIG. 12 is a figure showing the flow of the credit card data of this invention.

FIG. 12 shows a figure showing the flow of credit card data of this invention.

With this invention, as shown in FIG. 12, the credit card data passes through the service center from the user computer, and sent to the card company via the CAFIS network. Because of this, the credit card data of the user can be sent to the card company the user using without passing over the Internet.

The CAFIS is an acronym for Credit And Finance Information Switching System. It means the credit on-line system for shared use developed by NTT (Nippon Telegraph and Telephone) Corporation.

Figure 13:
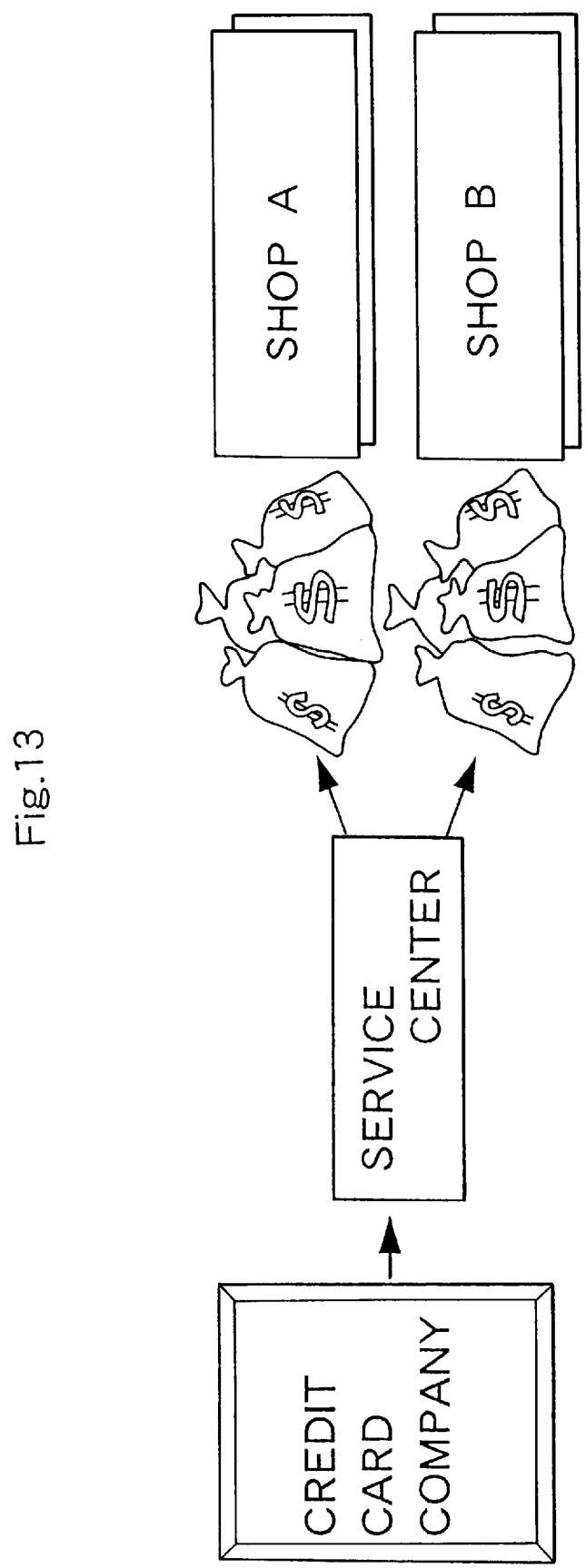
FIG. 13 is a figure showing the money flow of this invention.

FIG. 13 is a figure showing the flow of payment of this invention.

As shown in FIG. 13, the service center sends the payment collected from the credit card companies to each shop.

FIGS. 14 and 15 are figures showing the data sent from the user system to the service center of this invention.

Next, according to the flowcharts of FIG. 2 and FIG. 3, the procedure of on-line shopping of this invention is explained.

The procedure of on-line shopping is explained below wherein the computer network 4 is the Internet. The Internet refers to the network among public organizations based on the TCP/IP. Approval center 13 is various kinds of credit card companies.

It is possible to configure user system 5 of this invention with a computer and one or more programs for ordering products. The above-mentioned program is a program having functions of product selection unit 8, download unit 9, product confirmation unit 10, transmission unit 11, and encipherment unit 12. Also, it is assumed that the programs with which to order the products memorized in a floppy disk or CD-ROM are to be set ready on the user computer.

First of all, the user connects the user computer to the Internet or computer network 4 for starting a session and on-line shopping. Then, the user selects a mall in which to do shopping, out of shopping mall A 3a to shopping mall C 3c offered by shop system 2a to 2c, and connects the user computer to the shopping mall (S1). Connection to the Internet and connection to shopping malls use the same method with the regular connection method of on-line shopping of Internet. For instance, when the user selects shopping mall A 3a, the information screen 30 for shopping mall A of FIG. 4 is displayed on the user computer. Then, the user lets product list screen 31 displayed from shopping mall A, to select which products to buy. Selection of products is performed by a clicking the mouse at the MARK button (S2). Processing of the above S2 is performed by product selection unit 8. When the MARK button is clicked, download unit 9 fetches the product data of the product the user wanted to buy at the above S2 from the product data base provided for shop A system 2a. The seller data shown in FIGS. 14 and 15 also included in the product data and downloaded. Download unit 9 stores the received product data into a hard disk provided for the user computer. The product data shown in FIGS. 14 and 15 is an example of downloaded data by download unit 9. To select more products to buy from the same shopping mall, repeat the above steps from S2 to S3 (S4). To select a product to buy by connecting another shopping mall, the user calls up another shopping mall and repeat the above steps from S1 to S3 (S4). The download unit downloads and stores the product data with same format as shown in FIGS. 14 and 15 even when the product data is downloaded from other shopping malls. After finishing selection of all products the user wants to purchase (S3), the user finishes the session with the Internet (S5).

After finishing the session with the Internet (S5), a routine or another program that has the above product confirmation unit 10, transmission unit 11, and encipherment unit 12 is activated. The above program can be stored anywhere in a floppy disk, CD-ROM, or hard disk. When a program provided with product confirmation unit 10, transmission unit 11, and encipherment unit 12 is started, purchase product selection screen 32 is displayed on the user computer. On the purchase product selection screen 32, product data downloaded and stored in a hard disk by download unit 9 is displayed. On purchase product selection screen 32, products purchased previously through on-line shopping are also displayed besides the product that the user wants to purchase this time by the on-line shopping via the Internet. This is because download unit 9 downloads and stores new purchasing product data adding to the product data purchased in the past through on-line shopping without deleting them. It is possible to delete product data purchased by the past by downloading new product data. On purchase product selection screen 32, for instance, it is assumed that a purchase of T shirts was made on Oct. 15, 1995. It is possible that the user wants to purchase a T shirt again on Nov. 1, 1995. The user confirms the product to purchase this time on purchase product selection screen 32 (S6). The confirmation method is to move the cursor to the product to be purchased, and click the mouse, then move the cursor to the purchase button in the center of purchase product selection screen 32 and then click the mouse. The user can confirm the selection of the products from the different shopping malls by the purchase product selection screen 32. Above operation is a process implemented by product confirmation unit 10. After finishing the selection of products to purchase, the user clicks the TRANSMIT button on purchase product selection screen 32. Then, personal data input screen 33 of FIG. 7 is displayed on the computer. The user inputs the personal data (S7) according to the input guide on personal data input screen 33. When personal data has been input and the user clicks the OK button on personal data entry screen 33, a card data entry screen 34 of FIG. 8 is displayed on the computer. The user inputs the credit card data with which to make payment according to the input guide on card data entry screen 34 (S8). With the format shown in FIGS. 14 and 15, the personal data and the credit card data are copied and appended to each product data of the confirmed products by the product confirmation units. Accordingly, one credit card data can be used for the different products from the same or different shopping malls. When the user clicks the OK button on card data entry screen 34, the screen of FIG. 9A is displayed for the reconfirmation of product purchase. When the OK button is clicked on the screen of FIG. 9A, the user system 5 (the program that makes product order) automatically calls service center 7, sets settlement network 6 to transmit product data, personal data, and payment settlement data (credit card data) 21 to service center 7. The transmission is performed, for e example, by point-to-point protocol (PPP) via settlement network 6 using the public line which the third party cannot access.

FIGS. 14 and 15 show the product data (including seller data), personal data, payment settlement data (credit card data) 21 which user system 5 sends to service center 7.

In FIG. 15, although E-MAIL ADDRESS is not included in personal data entry screen 33, E-MAIL ADDRESS can be added to personal data entry screen 33 as an input item. Input items can be changed arbitrarily based on the needs of credit card companies or shops. The seller data of FIG. 14 and FIG. 15 may be downloaded by the database shop systems 2a to 2c when the session with the Internet is cut by the user. Or, it may be downloaded by the database shop systems 2a to 2c when the data is transferred from user system 5 to service center 7. When the transmission ends normally, and the approval of card use is confirmed by service center 7, the screen of FIG. 9B is displayed on the user computer.

The above steps from S1 to S8 are the portion the user is directly involved in on-line shopping. The processing explained below at S10 relates to service center 7, approval center 13, and each shop system 2a to 2c.

The product data, personal data, and payment settlement data 21 shown in FIG. 14 and FIG. 15 are the data before they are enciphered by encipherment unit 12.

Service center receives the product data, personal data, and payment settlement data 21 via settlement network 6 (S10). Because the product data, personal data, and payment settlement data 21 have been enciphered, service center 7 decodes them to original data by decoding unit 14. The encipherment method and decoding method is explained in detail in Embodiment 2. Based on the decoded product data, personal data, and payment settlement data 21, service center 7 then checks credit authorization of the user to approval center 13 (S11).

As described the download unit downloads the product data with the same format from a plurality of different shopping malls, the transmission unit transmits one card data as the payment settlement data for the plurality of products downloaded from the plurality of different shopping malls. As the result, the service center requests the approval center to collectively settle the plurality of products with one credit card data.

Approval center 13 of this invention is a credit card company. Among the product data, personal data, and payment settlement data 21, service center 7 gets data necessary for credit authorization check, and sends the credit authorization data to approval center 13, which is a corresponding credit card company, via the CAFIS network to check credit authorization 26. The CAFIS has the protocol which a plurality of credit card companies commonly use for checking credit authorization from the credit authorization checking terminal installed in the contract shop. Upon receiving data via TCP/IP from user system 5, service center 7 converts necessary data into the data that suits the protocol used by the CAFIS for credit authorization check. Approval center 13 or a credit card company returns the result of credit authorization check 26 to service center 7. (The returning of the result of credit authorization check from approval center 13 to service center 7 is not shown in FIG. 1.) If approval is not given as the result of credit authorization check (S12), service center 7 notifies user system 5 via settlement network 6 at real time that shopping can not be done (S17). When notified that shopping cannot be done, the user will retry the above steps from S6 to S8 if he or she has another credit cards so that payment for the product can be changed to a different credit card. Then again, product data, personal data, and payment settlement data 21 are sent to service center 7. If there is no other credit card, it is not possible to purchase the product. Therefore, the order content is filled out the order form, and the product can be ordered to the pertinent shop by facsimile machine, or telephone, or mail.

When approved by approval center 13 (S12), service center 7 notifies the user system of the completion of order processing for the shopping (S13). Completion of notification is done by displaying screen shown in FIG. 9(B) on the computer screen of user system 5.

When approved by approval center 13 (S12), among the product data, personal data, and payment settlement data 21 received from user system 5, service center 7 also notifies the pertinent shop systems 2a to 2c of the product data and personal data (product data, personal data 22 of FIG. 1) (S14). After receiving the product data and personal data 22 from service center 7, the shop system outputs order instruction by delivery processing unit 19 and delivers the ordered product to the user (product delivery 23 in FIG. 1) (S20). At this time, if delivery method or delivery fee of the product is stored in the product data for each product, the delivery processing can be promptly performed by referring to the delivery method or delivery fee.

Moreover, service center 7 invoices for the payment to approval center 13 (sales invoice 27 in FIG. 1) (S15). Because there are normally two or more credit card companies to which the payment for the product is made, the service center sums up the prices to be invoiced for each credit card company by accumulation unit 16. Sales invoice 27 is also sent on-line via the CAFIS similarly to credit authorization check 26. Or outputting on a magnetic tape is also possible for off-line invoice. Receiving sales invoice 27, approval center 13 makes payment to service center 7 (payment collection 28 in FIG. 1) (S21). Furthermore, approval center 13 requests payment transfer 25 to the user by payment collection unit 17 (S22). After collecting payments from approval center 13, service center 7 performs payment 24 to the shop (S16).

The on-line shopping of this invention is realized by the above procedure. The shop system receives payment from the credit card companies via the service center just like the ordinary payment caused by shopping with a credit card.

Because the product data or personal data is sent from service center 7 to the business terminal of each shop system as shown in FIG. 10, the above data can be fetched into the system of sales processing and so on of each shop system.

If the data regarding product delivery or the data for delivery fee and so on is stored in the product data, each shop system can promptly and efficiently perform delivery business by using these data.

In sending credit card data (and personal data) as the payment settlement data from the user system to the service center, the leakage of credit card data can be prevented because sending is performed via a dedicated settlement network 6.

Furthermore, security can be more improved because payment settlement data is enciphered. This helps resolve the leakage of credit card data which has been causing a problem for the on-line shopping via the Internet so far.

In addition, the credit card data is sent to the credit card companies which are the approval centers, from the service center via the CAFIS. For the credit card companies, the flow is the same as the normal flow for receiving credit card data for shopping with a credit card even though the service center exists between the users and the credit card companies.

As shown in FIG. 13, the payment is performed from the credit card companies to each shop via the service center. But, because the payment is done by the settlement among banks, the payment flow is the same as the normal payment flow for shopping with a credit card for both the credit card companies and shops even though the service center exist between the credit card companies and shops.

Embodiment 2

In this Embodiment 2, the encipherment method for encipherment unit 12 and the decoding method for decoding unit 14 of the above Embodiment 1 will be explained.

Figure 16:
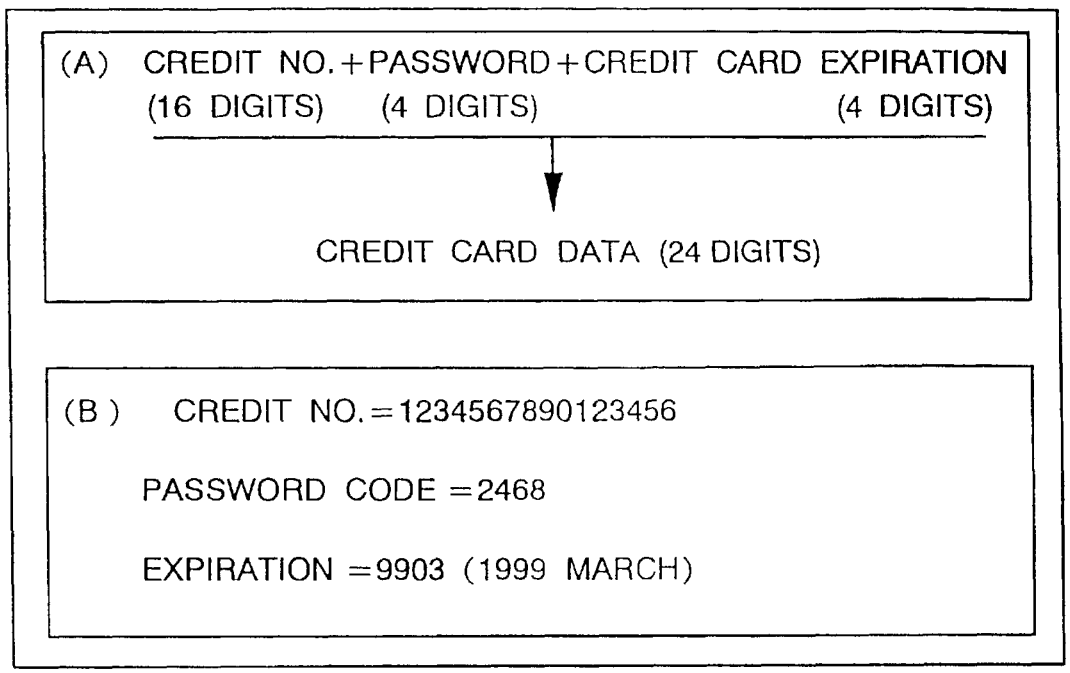
FIG. 16 is a figure showing the credit card data, which is the object of the encipherment and decoding of this invention.

FIG. 16 is a figure showing an example of data to be enciphered and decoded, and data contents.

With this embodiment, among the product data, personal data, payment settlement data 21 sent from user system 5 to service center 7, especially the credit number, password code, and credit card expiration are enciphered as the credit card data.

Figure 17:
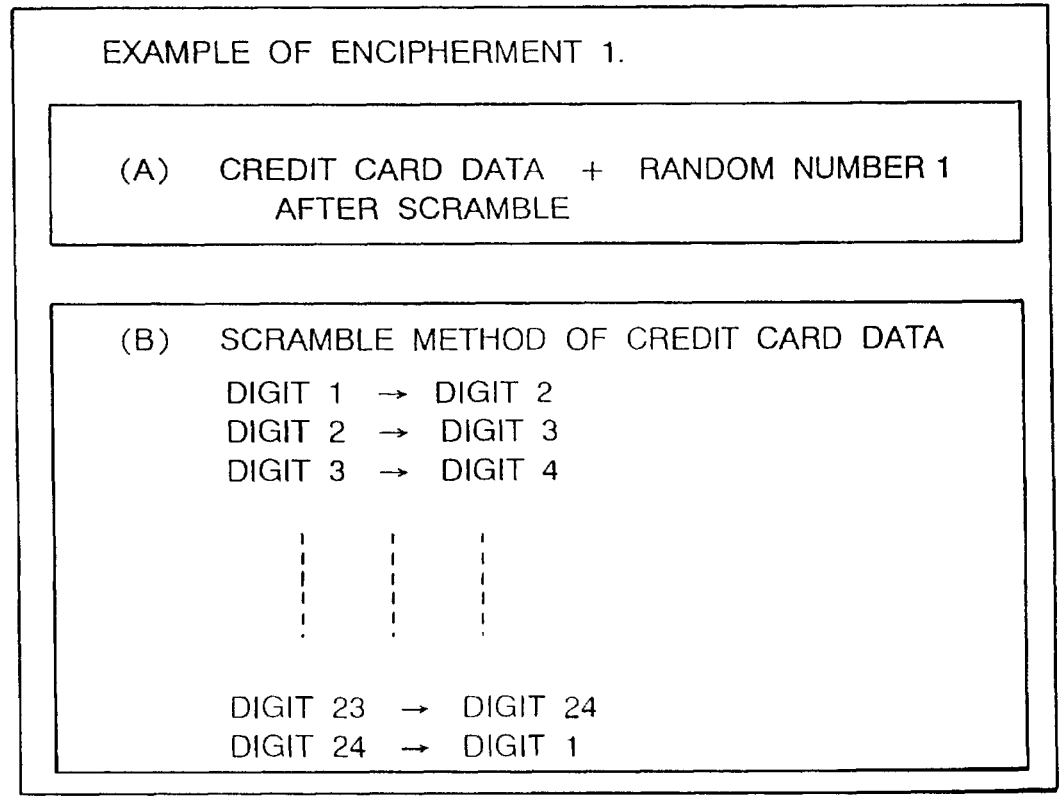
FIG. 17 is a figure showing an encipherment example of this invention.
Figure 20:
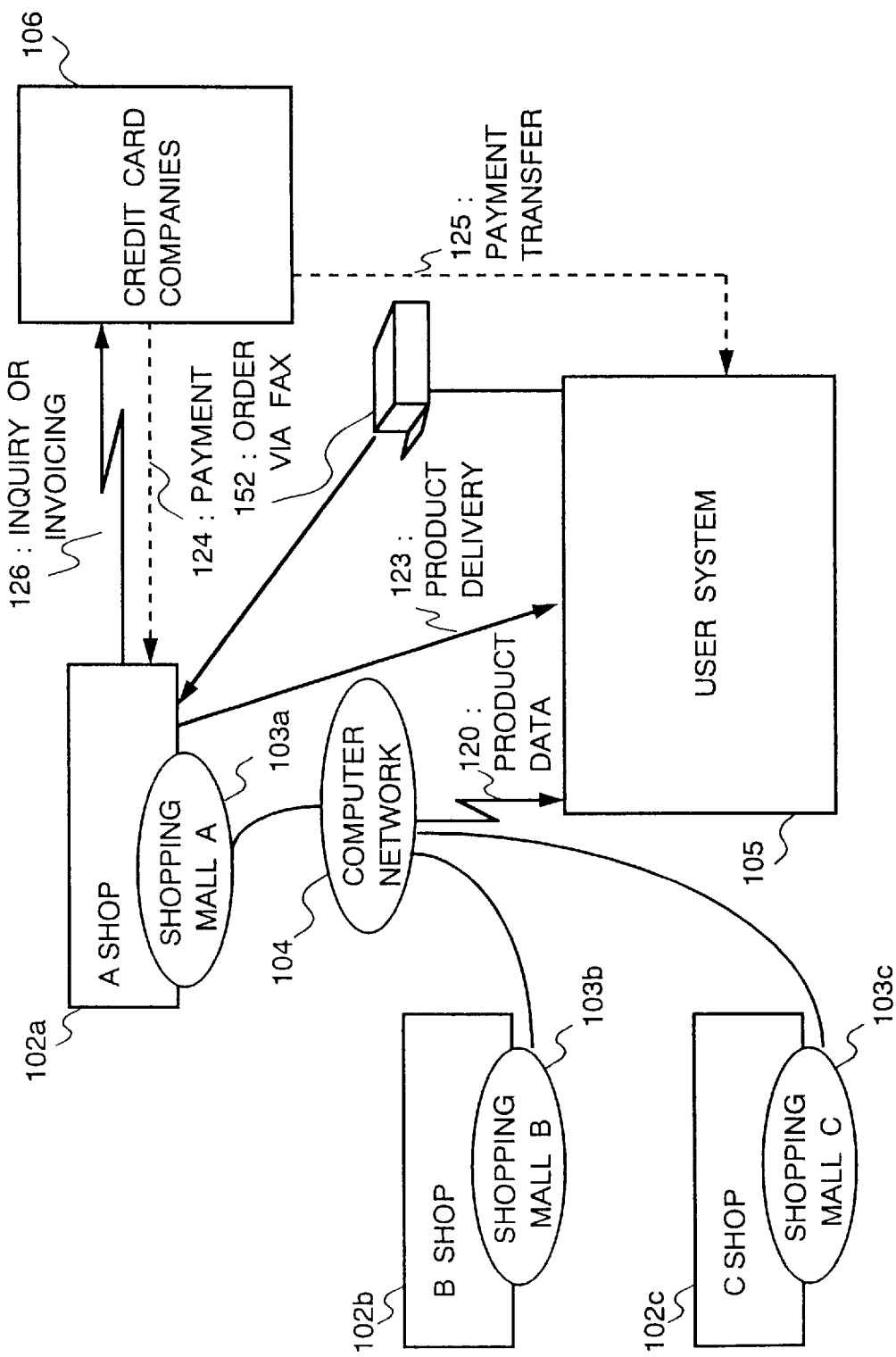
FIG. 20 is a figure showing a system configuration of the conventional on-line shopping system.

FIG. 17 through FIG. 19 are the figures explaining examples of enciphering credit card data.

Examples of encipherment shown in FIG. 17 through FIG. 19 are explained. The credit card data to be enciphered is, as shown in (A) of FIG. 16, the credit number, password code, and credit card expiration. And as shown in (B) of FIG. 16, the credit number is 16 digits of 1234567890123456. The password code is 4 digits of 2468. The credit card expiration is 4 digits of 9903, which indicates that it can be used until March 1999.

First, the encipherment example 1 shown in FIG. 17 is explained.

The encipherment example 1 shown in (A) of FIG. 17 shows scrambling credit card data, and concatenating random number 1 generated by encipherment unit 12 to the scrambled 24-digit credit card data so as to send it to service center 7 as the credit card data. The method of scrambling the above credit card data is as shown in (B) of FIG. 17. Of the 24-digit credit card data, the first digit is sifted to the second digit, the second digit is shifted to the third digit, and the third digit is shifted to the fourth digit. In this way, digits are shifted one by one from left to right, and the 24th digit is shifted to the first digit. The credit card data enciphered in encipherment example 1 is decoded to the original data by decoding unit 14 of service center 7. The decoding method is, first of all, remove random number 1 from the credit card data including the received random number 1. Then, the first digit of the credit card data is sifted to the 24th digit, the second digit is shifted to the first digit, and the third digit is shifted to the second digit, and the fourth digit is shifted to the third digit. In this way, the original credit card data is restored by shifting digits from right to left one by one.

For encipherment example 2 of FIG. 18, 24-digit credit card data, five digits of random number 1, in total 29 digits are scrambled and sent to service center 7. The scramble method is as shown in (B) of FIG. 18. The first digit is shifted to the second digit, the second digit is shifted to the third digit, and the third digit is shifted to the fourth digit. Then, 28th digit is shifted to the 29th digit, and the 29th digit is shifted to the first digit. In this way, 29-digit data including the credit card data and random number 1 are shifted one by one from left to right. The decoding method of decoding unit 14 at service center 7 is to restore the received credit card data including random number 1 into the original data with the method opposite to the scramble method shown in (B) of FIG. 18. First of all, the first digit is shifted to the 29th digit, the second digit is shifted to the first digit, the third digit is shifted to the second digit, and the fourth digit is shifted to the third digit. In this way, when the 29-digit credit card data including random number 1 is shifted one by one from right to left, the original 29-digit data is restored. When the 29-digit credit card data including random number 1 is restored, the 24-digit credit card data is taken out by removing five digits from the right, which are random number 1, out of the 29 digits.

For encipherment example 3 of (A) of FIG. 19, random number 1 and random number 2 are concatenated to the scrambled credit card data and sent to service center 7. The method of scrambling the credit card data of encipherment example 3 is the same as the scramble method of the credit card data of encipherment example 1. For encipherment example 4 shown in (B) of FIG. 19, 24-digit credit card data and five digits of random number 1, in total 29 digits, are scrambled, and random number 2 is concatenated. The method of scrambling 24-digit credit card data and five digits of random number 1, in total 29 digits, is the same as the scramble method of the above encipherment example 2. Furthermore, for encipherment example 5 of (C) of FIG. 19, 24-digit credit card data, 5-digit random number 1, and 6-digit random number 2, in total 35 digits are scrambled and sent to service center 7.

In this embodiment 2, encipherment example 1 to 5 were explained. However, the above examples are only examples, and do not limit the methods of encipherment and decoding.

In this way, by enciphering and sending the credit card data to the service center, moreover, by running the credit card data on the settlement network which is a dedicated line, security is further improved effectively.

Having thus described several particular embodiments of the invention, various alterations, modifications, and improvements will readily occur to those skilled in the art. Such alterations, modification,s and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. An on-line computerized shopping system, comprising:
   (a) a store system for memorizing product data and providing a shopping mall for products via a shopping mall network;
   (b) a user system including
      a product selection unit connected to the shopping mall network, for selecting a product to be purchased from the shopping mall provided by the store system,
      a download unit for downloading selected product data from the store system via the shopping mall network, and
      a transmission unit for inputting payment settlement data of the product and personal data of a user who selects the product, for automatically setting an independent settlement network connectable to a service center that carries out settlement, when purchasing a downloaded product, the settlement network being different from the shopping mall network, and for transmitting the selected product data, the payment settlement data and the personal data to the service center via the settlement network based on a first protocol; and
   (c) the service center for receiving the selected product data, the payment settlement data, and the personal data via the settlement network from the user system and then performing a payment settlement using the payment settlement data and the personal data, and for distributing the selected product data and the personal data to the store system,
   wherein the shopping mall network is not used to transmit the payment settlement data.

2. The on-line shopping system of claim 1, further comprising an approval center connectable to the service center via an authorization network for approving the payment settlement based on a second protocol different from the first protocol, and wherein the service center selects at least the payment settlement data among the received product data, the payment settlement data, and the personal data received based on the first protocol, converts the at least the payment settlement data to be a suitable data to the second protocol, and then requests the approval of the payment settlement to the approval center.

3. The on-line shopping system of claim 2, wherein the user system includes an encipherment unit for enciphering at least a part of the selected product data, the payment settlement data, and the personal data, and wherein the service center includes a decoding unit for decoding the enciphered part of the selected product data, the payment settlement data, and the personal data.

4. The on-line shopping system of claim 1, wherein the service center further includes a distribution unit for distributing the product data and the personal data for which the payment settlement has been approved, and wherein the store system further includes a delivery processing unit for receiving the product data and the personal data and then performs a delivery process of the product.

5. The on-line shopping system of claim 2, wherein the payment settlement data includes card data of a credit card, and wherein the approval center approves the payment settlement based on the card data.

6. The on-line shopping system of claim 5, wherein the download unit downloads the product data with the same format from a plurality of different shopping malls, the transmission unit transmits one card data as the payment settlement data for the plurality of products downloaded from the plurality of different shopping malls, and wherein the service center requests the approval center to collectively settle the plurality of products with one card data.

7. The on-line shopping system of claim 6, wherein the user system further includes a product confirmation unit for selecting a product to be purchased from the downloaded products.

8. The on-line shopping system of claim 2, wherein the approval center further includes a payment collection unit for collecting the payment based on the card data.

9. The on-line shopping center of claim 8, wherein the service center further includes an accumulation unit for summing up amounts of the payment settlement based on the card data in correspondence with each of the plurality of the approval centers.

10. The on-line shopping system of claim 2, wherein the settlement network is a network set separately between the user system and the service center and is not addressed by a third party during communication.

11. The on-line shopping system of claim 10, wherein the shopping mall network is the Internet.

12. The on-line shopping system of claim 11, wherein the settlement network is formed by a public line, wherein the first protocol is Point-to-Point Protocol, wherein the second protocol is a protocol which is used between the shop system and the approval center for a shopping by the credit card.

13. A computerized payment settlement method which includes a store system including shopping malls, a user system that selects a product to be purchased from the shopping malls, an approval center that approves a payment settlement, and a service center which exists among the store system, the user system and the approval center, the payment settlement method, comprising steps of:
   (a) selecting the product to be purchased from shopping malls offered by the store system via a shopping mall network in the user system;
   (b) downloading data of selected products from the store system into the user system via the shopping mall network;
   (c) automatically setting an independent settlement network connected to the service center, the settlement network being different from the shopping mall network, and transmitting the data of downloaded products, data for the payment settlement, and data of a purchaser of the product from the user system to the service center using the independent settlement network;

(d) requesting an approval of the payment settlement from the service center to the approval center based on the data for the payment settlement;

(e) approving the payment settlement in the approval center based on the payment settlement data;

(f) distributing product data approved by the approval center for the payment settlement and the data of the product purchaser from the service center to the store system; and (g) collecting payment in the approval center from the purchaser of the product based on the payment settlement data, wherein the shopping mall network is not used to transmit the payment settlement data.

14. The payment settlement method of claim 13, wherein the step for requesting the approval of the payment settlement includes a step of converting the received payment settlement data suitable to a predefined approval protocol provided by the approval center and transmitting the converted data to the approval center via a credit authorization network.

15. The payment settlement method of claim 13, wherein the step for selecting the product includes a step of selecting products from different shopping malls, and wherein the step for downloading includes a step of storing the data of products selected from different shopping malls in a same format.

16. The payment settlement method of claim 15, further comprising steps of confirming a product to be purchased based on the product data downloaded between the downloading step and the automatically setting and transmitting step.

17. The payment settlement method of claim 16, further comprising step of providing one credit card data to pay for the plurality of products selected from the different shopping malls between the above downloading step and the transmitting step, and wherein the step for approving the payment settlement includes a step of settling collectively for the plurality of products purchased based on one credit card data.

18. The payment settlement method of claim 17, wherein said selecting includes connecting the user system to the Internet as the shopping mall network to access the shopping mall.

19. A user system for an on-line shopping system including a store system, connected to a shopping mall network, for memorizing product data and for offering a product via the shopping mall network, and using a settlement network connected to a service center the user system comprising:

a product selection unit, connectable to the shopping mall network, for selecting a product to be purchased from the shopping mall offered by the store system via the shopping mall network, a download unit for downloading selected product data from the store system via the shopping mall network, and a transmission unit for, when purchasing the downloaded products, automatically setting the settlement network between the service center that performs payment settlement;

wherein, the shopping mall network is not used to transmit payment settlement data, and wherein the settlement network being different from the shopping mall network is used to transmit the selected product data, product payment data, and personal data to the service center.

20. A service center for an online shopping system using a computer network including a store system for memorizing product data and for offering a product from a shopping mall via a shopping mall network, a user system for selecting a product to be purchased from the shopping mall offered by the store system via the shopping mall network, and an approval center for approving a payment settlement, the service center being automatically connectable to a settlement network different from the shopping mall network upon a call from the user system, the service center being arranged to receive selected product data, payment settlement data and personal data via the settlement network from the user system that does not transmit the payment settlement data via the shopping mall network, the service center being further arranged to perform a settlement using the payment settlement data and the personal data, and distributes the selected product data and the personal data to the store system without transmitting the payment settlement data via the shopping mall network.

21. An on-line computerized shopping system, comprising:

(a) a store system constructed and arranged to memorize product data and to provide shopping mall products via a shopping mall network;

(b) a user system constructed and arranged to download product data from the store system via the shopping mall network and to transmit the product data, product payment settlement data, and user data via a payment network based on a first protocol;

(c) a service center constructed and arranged to receive via the settlement network the product data, the product payment settlement data, the user data and to request an approval of payment settlement via a credit authorization network based on a second protocol different from the first protocol, the service center being further arranged to obtain the approval of a payment settlement from an approval center and to perform the payment settlement; and (d) the approval center constructed and arranged to receive a request for approving the payment settlement from the service center via the credit authorization network and to approve the payment settlement;

wherein the shopping mall network is a network that can be accessed from a third party, and the payment settlement network is a network that communicates exclusively between the user system and the service center, and the credit authorization network is a network used for credit authorization;

wherein the user system transmits the selected product data, payment settlement data, and the user data not to the store system via the shopping mall network but to the service center based on the first protocol via the payment settlement network;

wherein the service center receives the product data, the product payment settlement data, and the user data based on the first protocol, changes at least the product payment settlement data among the received product data, the product payment settlement data, and the user data so as to be fitted to the second protocol, and requests the approval of the payment settlement to the approval center based on the second protocol via the credit authorization network, and obtains the approval, and distributes the product data of which the payment settlement is approved, and the user data to the store system via a communication line, makes the store system receive the product data and the user data, and performs a delivery process of the product;

wherein data transmitted between the user system and the store system via the shopping mall network is only product data being downloaded from the store system to the user system, and wherein the service center communicates with the user system via the settlement network, the approval center via the credit authorization network, and store system via the communication line, without using the shopping mall network.

22. The on-line shopping system of claim 20, wherein the user system includes an encipherment unit for enciphering at least a part of the selected product data, the payment settlement data, and the personal data, and wherein the service center includes a decoding unit for decoding the enciphered part of the selected product data, the payment settlement data, and the personal data.

23. The on-line shopping system of claim 21, wherein the payment settlement data includes card data of a credit card, and wherein the approval center approves the payment settlement based on the card data.

24. The on-line shopping system of claim 23, wherein the user system includes a download unit arranged to download the product data with the same format from a plurality of different shopping malls, and a transmission unit arranged to transmit one card data as the payment settlement data for the plurality of products downloaded from the plurality of different shopping malls, and wherein the service center requests the approval center to collectively settle the plurality of products with one card data.

25. The on-line shopping system of claim 24, wherein the user system further includes a product confirmation unit for selecting a product to be purchased from the downloaded products.

26. The on-line shopping system of claim 21, wherein the approval center further includes a payment collection unit for collecting the payment based on the card data.

27. The on-line shopping center of claim 26, wherein the service center further includes an accumulation unit for summing up amounts of the payment settlement based on the card data in correspondence with each of the plurality of the approval centers.

28. The on-line shopping system of claim 21, wherein the settlement network is a network set separately between the user system and the service center and is not addressed by a third party during communication.

29. The on-line shopping system of claim 28, wherein the shopping mall network is the Internet.

* * * * *